US011843327B2

(12) United States Patent
Momochi et al.

(10) Patent No.: US 11,843,327 B2
(45) Date of Patent: Dec. 12, 2023

(54) POWER CONVERSION DEVICE WITH CURRENT HYSTERESIS BAND CONTROL

(71) Applicant: TOSHIBA MITSUBISHI-ELECTRIC INDUSTRIAL SYSTEMS CORPORATION, Chuo-ku (JP)

(72) Inventors: Nobuyuki Momochi, Chuo-ku (JP); Tomohiro Tanaka, Chuo-ku (JP)

(73) Assignee: TOSHIBA MITSUBISHI-ELECTRIC INDUSTRIAL SYSTEMS CORPORATION, Chuo-ku (JP)

( * ) Notice: Subject to any disclaimer, the term of this patent is extended or adjusted under 35 U.S.C. 154(b) by 274 days.

(21) Appl. No.: 17/312,198

(22) PCT Filed: Sep. 5, 2019

(86) PCT No.: PCT/JP2019/035049
§ 371 (c)(1),
(2) Date: Jun. 9, 2021

(87) PCT Pub. No.: WO2021/044597
PCT Pub. Date: Mar. 11, 2021

(65) Prior Publication Data
US 2022/0052625 A1 Feb. 17, 2022

(51) Int. Cl.
*H02M 7/5395* (2006.01)
*H02M 7/5387* (2007.01)

(52) U.S. Cl.
CPC ....... *H02M 7/5395* (2013.01); *H02M 7/5387* (2013.01)

(58) Field of Classification Search
CPC .......... H02M 7/5387; H02M 7/53871; H02M 7/53873; H02M 7/53875; H02M 7/5395
See application file for complete search history.

(56) References Cited

U.S. PATENT DOCUMENTS

| 4,926,104 | A | * | 5/1990 | King | H02M 7/53875 318/599 |
| 5,942,876 | A | * | 8/1999 | Maekawa | H02M 7/53875 318/811 |
| 9,853,559 | B2 | | 12/2017 | Taniguchi et al. | |

FOREIGN PATENT DOCUMENTS

JP 2008-109790 A 5/2008
JP 2013-55794 A 3/2013

OTHER PUBLICATIONS

International Search Report dated Dec. 3, 2019 in PCT/JP2019/035049 filed on Sep. 5, 2019, 2 pages.

(Continued)

*Primary Examiner* — Alex Torres-Rivera
(74) *Attorney, Agent, or Firm* — Oblon, McClelland, Maier & Neustadt, L.L.P.

(57) ABSTRACT

A power conversion device includes: an inverter that includes a switching element and converts DC power into AC power; a current detector that detects an output current of the inverter; and a controller that controls the inverter to allow the output current detected by the current detector to follow a current command value having a sinusoidal waveform. The controller compares a current deviation of the output current from the current command value with a hysteresis band to control switching of the switching element. The controller sets the hysteresis band so that a hysteresis band in a zero-crossing area of the current command value is smaller than a hysteresis band in a peak area of the current command value.

9 Claims, 10 Drawing Sheets

(56) References Cited

OTHER PUBLICATIONS

Office Action dated Apr. 11, 2022, in corresponding Indian Patent Application No. 202117028718 (with English Translation), 6 pages.
Korean Office Action dated Mar. 9, 2023 in Korean Patent Application No. 10-2021-7020019 (with English machine translation), 6 pages.
K. M. Rahman, et al., "Variable-Band Hysteresis Current Controllers for PWM Voltage-Source Inverters," IEEE Transactions on Power Electronics, vol. 12, No. 6, Nov. 1997, pp. 964-970.

* cited by examiner

POWER CONVERSION DEVICE WITH CURRENT HYSTERESIS BAND CONTROL

TECHNICAL FIELD

The present invention relates to a power conversion device.

BACKGROUND ART

Japanese Patent Laying-Open No. 2013-55794 (PTL 1) discloses a power conversion device including a single-phase inverter that converts a DC voltage into AC power and outputs the AC power, a filter removing high-frequency noise of an AC output current from the single-phase inverter, and a control means for PWM (Pulse Width Modulation)-controlling a power device configuring the single-phase inverter. In PTL 1, the control means has a triangular wave carrier frequency generating means for generating triangular waves of mutually different carrier frequencies. The control means is configured such that it considers a current ripple of an AC output current output from the filter, and when the AC output current has an absolute value exceeding a preset threshold value, the control means performs PWM control using a triangular wave of a lower carrier frequency. According to the power conversion device of PTL 1, when an instantaneous value of an AC output current for which a current ripple becomes large is around zero, the carrier frequency is not reduced, which can prevent a current from having a ripple with an increased maximum value in amplitude.

CITATION LIST

Patent Literature

PTL 1: Japanese Patent Laying-open No. 2013-055794

SUMMARY OF INVENTION

Technical Problem

In addition to the PWM control in the triangular wave comparison system as described above, PWM control in an instantaneous current value control system that controls a current fast so that a current output from an inverter follows a current command value is applied to control a switching element constituting the inverter. In this instantaneous current value control system, a switching frequency can be controlled by increasing/decreasing a hysteresis band of a hysteresis comparator. However, when the hysteresis band remains fixed, and the AC output current has an instantaneous value around zero, the current will have a large current ripple.

In order to reduce the current ripple, it is effective to increase the inductance of a reactor constituting the filter. This, however, would invite increasing the reactor's size and weight. Alternatively, the current ripple can be reduced by reducing the hysteresis band per se. However, the switching frequency increases, and there is a concern that a switching loss caused in the inverter may increase.

The present invention has been made to address the above issue, and an object of the present invention is to provide a power conversion device capable of reducing a current ripple included in an output current while reducing a switching loss.

Solution to Problem

According to an aspect of the present invention, a power conversion device comprises: an inverter that has a switching element and converts DC power into AC power; a current detector that detects an output current of the inverter; and a controller that controls the inverter to allow the output current detected by the current detector to follow a current command value having a sinusoidal waveform. The controller is configured to control switching of the switching element by comparing a current deviation of the output current with respect to the current command value with a hysteresis band. The controller sets the hysteresis band such that a hysteresis band in a zero crossing area of the current command value is smaller than a hysteresis band in a peak area of the current command value.

Advantageous Effects of Invention

The present invention can thus provide a power conversion device capable of reducing a current ripple included in an output current while reducing a switching loss.

DESCRIPTION OF EMBODIMENTS

Hereinafter reference will be made to the drawings to describe the present invention in embodiments. Note that in the figures, identical or equivalent components are identically denoted and will not be described repeatedly.

Figure 1:
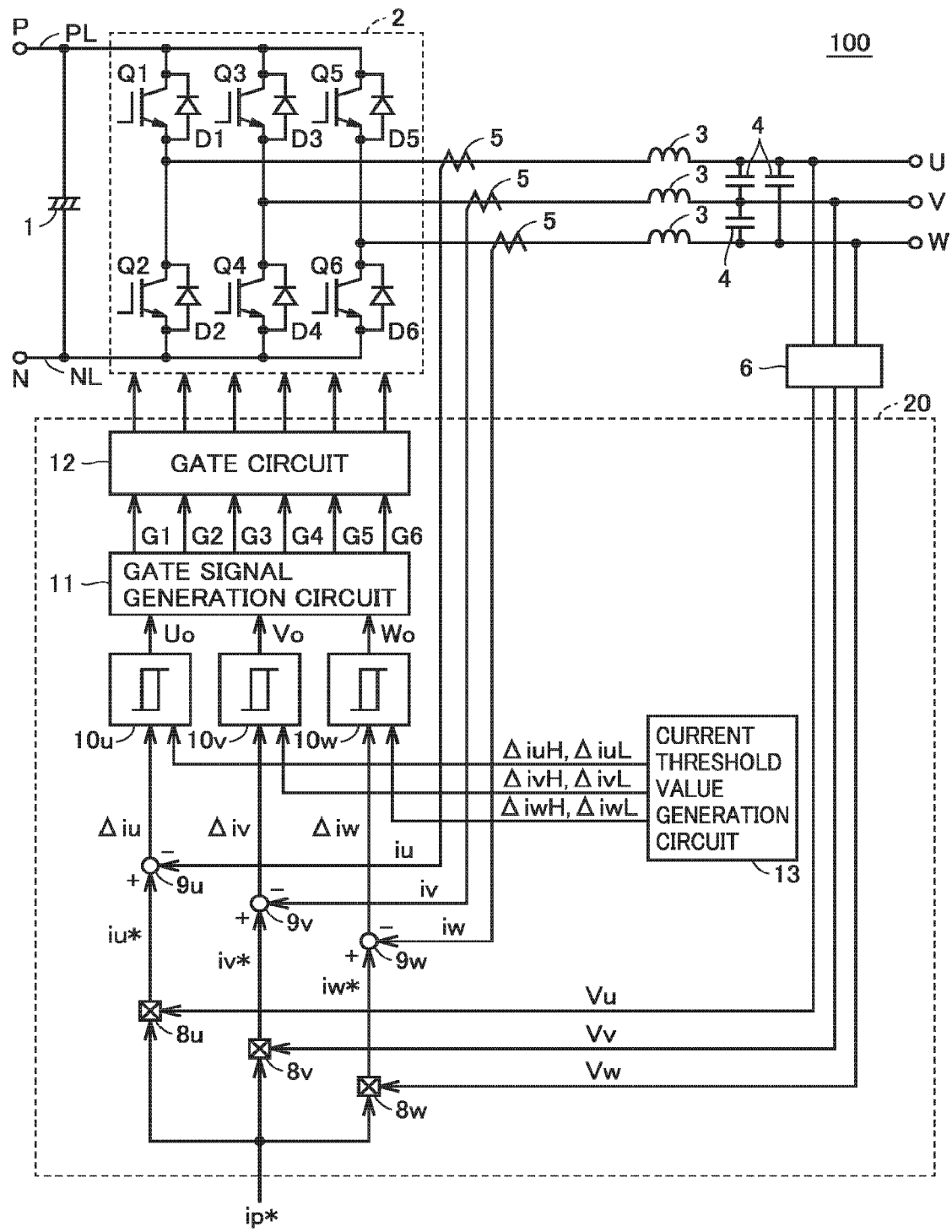
FIG. 1 schematically shows a configuration of a power conversion device according to an embodiment.

FIG. 1 schematically shows a configuration of a power conversion device according to an embodiment. The power conversion device according to the present embodiment is configured to perform power conversion between DC power and three-phase AC power (U-phase power, V-phase power, W-phase power).

Referring to FIG. 1, a power conversion device 100 comprises DC terminals P and N, AC terminals U, V and W, a DC smoothing capacitor 1, an inverter 2, a reactor 3, an AC capacitor 4, a current detector 5, a voltage detector 6, and a controller 20.

DC terminal P (a high potential side DC terminal) and DC terminal N (a low potential side DC terminal) receive DC power from a DC power supply (not shown). A DC positive bus PL is connected to DC terminal P, and a DC negative bus NL is connected to DC terminal N. A load (not shown) is connected to AC terminals U, V, W. AC terminal U is a U-phase terminal, AC terminal V is a V-phase terminal, and AC terminal W is a W-phase terminal.

Inverter 2 receives DC power from DC smoothing capacitor 1 and converts it into three-phase AC power. Inverter 2 outputs the three-phase AC power, which is in turn supplied to the load (not shown) via AC terminals U, V, W. Inverter 2 has power semiconductor switching elements (hereinafter, also simply referred to as "switching elements") Q1 to Q6.

Switching elements Q1 and Q2 are connected in series between DC positive bus PL and DC negative bus NL to form a U-phase arm. Switching elements Q3 and Q4 are connected in series between DC positive bus PL and DC negative bus NL to form a V-phase arm. Switching elements Q5 and Q6 are connected in series between DC positive bus PL and DC negative bus NL to form a W-phase arm.

While in FIG. 1 an IGBT (Insulated Gate Bipolar Transistor) is used as the switching element, a MOSFET (Metal Oxide Semiconductor Field Effect Transistor) or any self arc-distinguishing switching element can be used. Diodes D1 to D6 are connected in anti-parallel to switching elements Q1 to Q6, respectively. Diodes D1 to D6 are each provided to pass a freewheel current when the respective switching element is turned off. When the switching element is a MOSFET, the freewheeling diode is composed of a parasitic diode (a body diode). When the switching element is an IGBT which does not have a diode incorporated therein, the freewheeling diode is composed of a diode connected to the IGBT in anti-parallel.

Switching elements Q1 and Q2 are controlled by gate signals G1 and G2, respectively, switching elements Q3 and Q4 are controlled by gate signals G3 and G4, respectively, and switching elements Q5 and Q6 are controlled by gate signals G5 and G6, respectively. Gate signals G2, G4, G6 are inverted versions of gate signals G1, G3, G5, respectively.

Switching elements Q1, Q3, and Q5 are turned on when the gate signals G1, G3, and G5, respectively, are set to a logical value of "1," and switching elements Q1, Q3, and Q5 are turned off when the gate signals G1, G3, and G5, respectively, are set to a logical value of "0." Switching elements Q2, Q4, and Q6 are turned on when the gate signals G2, G4, and G6, respectively, are set to the logical value of "1" and switching elements Q2, Q4, and Q6 are turned off when the gate signals G2, G4, and G6, respectively, are set to the logical value of "0."

Gate signals G1 to G6 are each a pulse signal train and a PWM signal. Gate signals G1 and G2, G3 and G4, and G5 and G6 are out of phase by 120 degrees. How the gate signals G1 to G6 are generated will be described hereinafter.

Reactor 3 and AC capacitor 4 constitute a filter circuit, and remove a harmonic component generated from inverter 2. Reactor 3 has one end connected to a connection point of the two switching elements of the respective phase arm. Reactor 3 has the other end connected to the AC terminal of the respective phase. AC capacitor 4 is connected between two phases.

Current detector 5 detects three-phase AC current iu, iv, iw output from inverter 2 (hereinafter also referred to as a reactor current) and provides a detected value to controller 20. Voltage detector 6 detects three-phase AC voltage (a U-phase voltage Vu, a V-phase voltage Vv, a W-phase voltage Vw), and provides a detected value to controller 20.

Controller 20 controls the switching of switching elements Q1 to Q6 constituting inverter 2. Controller 20 generates a control signal (gate signals G1 to G6) for turning on/off switching elements Q1 to Q6, and outputs the generated gate signals G1 to G6 to inverter 2. Controller 20 is implemented mainly by a CPU (Central Processing Unit), a memory, an interface circuit, and so forth.

In the present embodiment, controller 20 generates the gate signals G1 to G6 in an instantaneous current value control system. Specifically, controller 20 includes multipliers $8u$, $8v$, $8w$, subtractors $9u$, $9v$, $9w$, hysteresis comparators $10u$, $10v$, $10w$, a gate signal generation circuit 11, a gate circuit 12, and a current threshold value generation circuit 13.

Multiplier $8u$ multiplies the U-phase voltage Vu detected by voltage detector 6 by a gain corresponding to a previously determined active current command value ip* to generate a U-phase current command value iu*. The active current command value ip* is a value of a command for an active current output by inverter 2. The weight for the active current command value ip* is determined with the gain of voltage detector 6 considered. Multiplier $8v$ multiplies the V-phase voltage Vv detected by voltage detector 6 by the gain corresponding to the active current command value ip* to generate a V-phase current command value iv*. Multiplier $8w$ multiplies the W-phase voltage Vw detected by voltage detector 6 by the gain corresponding to the active current command value ip* to generate a W-phase current command value iw*.

Subtractor $9u$ calculates a current deviation Δiu between the U-phase current command value iu* and a U-phase current iu detected by current detector 5. Subtractor $9v$ calculates a current deviation Δiv between the V-phase current command value iv* and a V-phase current iv detected by current detector 5. Subtractor $9w$ calculates a current deviation Δiw between the W-phase current command value iw* and a W-phase current iw detected by current detector 5.

Current threshold value generation circuit 13 generates a threshold value for a current deviation Δi (a U-phase current deviation Δiu, a V-phase current deviation Δiv, and a W-phase current deviation Δiw). The threshold value includes an upper limit value ΔiH that is a positive threshold value for the current deviation Δi and a lower limit value ΔiL that is a negative threshold value for the current deviation Δi. The upper limit value ΔiH and the lower limit value ΔiL are equal in magnitude. The upper limit value ΔiH has an upper limit value ΔiuH for the U-phase current deviation Δiu, an upper limit value ΔivH for the V-phase current deviation Δiv, and an upper limit value ΔiwH for the W-phase current deviation Δiw. The lower limit value ΔiL has a lower limit value ΔiuL for the U-phase current deviation Δiu, a lower limit value ΔivL for the V-phase current deviation Δiv, and a lower limit value ΔiwL for the W-phase current deviation Δiw.

Hysteresis comparator $10u$ receives the U-phase current deviation Δiu from subtractor $9u$ and receives the upper limit value ΔiuH and the lower limit value ΔiuL from current threshold value generation circuit 13. Hysteresis comparator 10*u* compares the U-phase current deviation Δiu with the upper limit value ΔiuH and the lower limit value ΔiuL, and outputs a signal indicating a comparison result thereof. The output signal of hysteresis comparator 10*u* corresponds to a PWM signal Uo.

Hysteresis comparator 10*v* receives the V-phase current deviation Δiv from subtractor 9*v*, and receives the V-phase upper limit value ΔivH and the V-phase lower limit value ΔivL from current threshold value generation circuit 13. Hysteresis comparator 10*v* compares the V-phase current deviation Δiv with the V-phase upper limit value ΔivH and the V-phase lower limit value ΔivL, and outputs a signal indicating a comparison result thereof. The output signal of hysteresis comparator 10*v* corresponds to a PWM signal Vo.

Hysteresis comparator 10*w* receives the W-phase current deviation Δiw from subtractor 9*w*, and receives the W-phase upper limit value ΔiwH and the W-phase lower limit value ΔiwL from current threshold value generation circuit 13. Hysteresis comparator 10*w* compares the W-phase current deviation Δiw with the W-phase upper limit value ΔiwH and the W-phase lower limit value ΔiwL, and outputs a signal indicating a comparison result thereof. The output signal of hysteresis comparator 10*w* corresponds to a PWM signal Wo.

The PWM signals Uo, Vo and Wo output from hysteresis comparators 10*u*, 10*v* and 10*w* are input to gate signal generation circuit 11. Gate signal generation circuit 11 subjects the PWM signals Uo, Vo, Wo and their logically inverted signals to prescribed on-delay processing to generate gate signals G1 to G6 for controlling the switching of switching elements Q1 to Q6, respectively, of inverter 2. Gate signals G1 to G6 generated by gate signal generation circuit 11 are applied to the gates of the respective switching elements through gate circuit 12.

Figure 2:
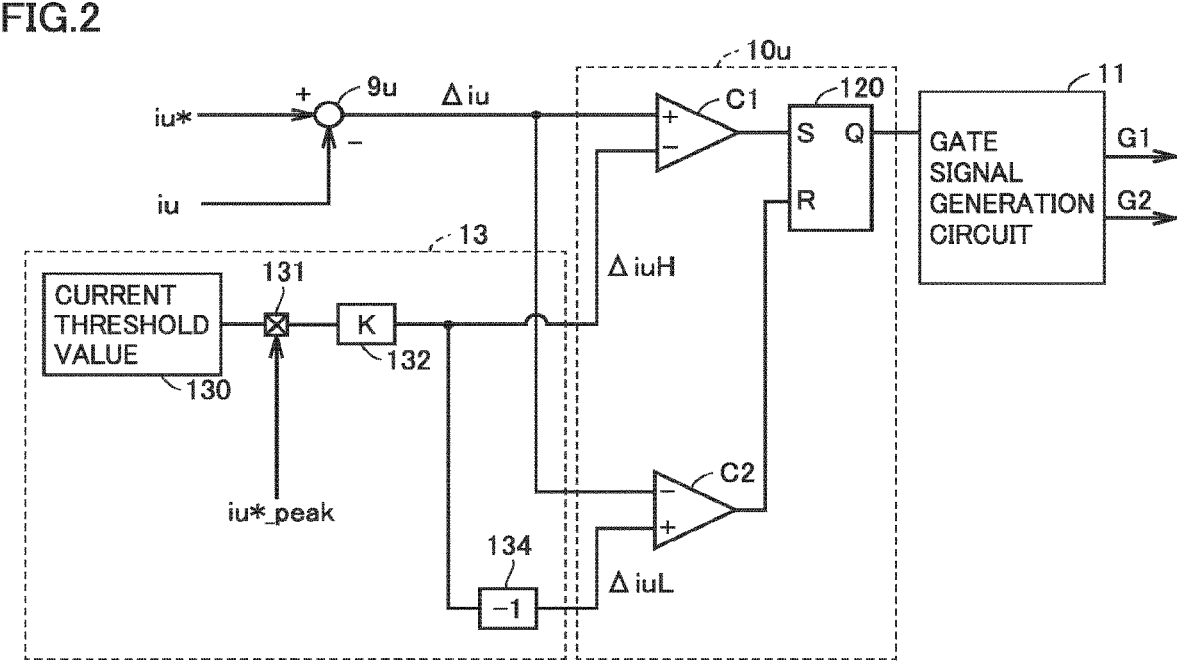
FIG. 2 is a block diagram showing a conventional, exemplary configuration of a current threshold value generation circuit and a hysteresis comparator.

FIG. 2 is a block diagram showing a conventional, exemplary configuration of current threshold value generation circuit 13 and hysteresis comparator 10*u*. In the conventional, exemplary configuration shown in FIG. 2, current threshold value generation circuit 13 includes a current threshold value 130, and multipliers 131, 132 and 134.

The current threshold value 130 is a preset reference value for determining a hysteresis band for the U-phase current iu for the U-phase current command value iu*. The hysteresis band affects a switching frequency of a switching element of inverter 2. That is, as the hysteresis band becomes smaller, the switching element is switched more frequently, so that the switching frequency increases. The current threshold value 130 can be set based on a switching speed of a switching element of inverter 2 or the like.

Multiplier 131 multiplies the current threshold value 130 by a peak value (iu*_peak) of the U-phase current command value iu*. Multiplier 132 multiplies the output value of multiplier 131 by a gain K. The gain K is a coefficient for determining a hysteresis band, and can assume any positive value. The result of the multiplication by multiplier 132 is given to hysteresis comparator 10*u* as the upper limit value ΔiuH for the U-phase current deviation Δiu.

Multiplier 134 multiplies the result of the multiplication by multiplier 132 by "−1." The result of the multiplication by multiplier 134 is given to hysteresis comparator 10*u* as the lower limit value ΔiuL for the U-phase current deviation Δiu. The upper limit value ΔiuH and the lower limit value ΔiuL are equal in magnitude to each other and have different signs.

Hysteresis comparator 10*u* includes comparators C1 and C2 and an RS flip-flop 120. Comparator C1 compares the U-phase current deviation Δiu provided from subtractor 9*u* with the upper limit value ΔiuH provided from current threshold value generation circuit 13, and outputs a signal indicating the comparison result. Comparator C1 outputs a signal having a logical value of "1" for Δiu>ΔiuH, and outputs a signal having a logical value of "0" for Δiu<ΔiuH. Comparator C2 compares the U-phase current deviation Δiu provided from subtractor 9*u* with the lower limit value ΔiuL provided from current threshold value generation circuit 13, and outputs a signal indicating the comparison result. Comparator C2 outputs a signal having the logical value of "1" for Δiu<ΔiuL, and outputs a signal having the logical value of "0" for Δiu>ΔiuL.

RS flip-flop 120 receives a signal from comparator C1 at a set terminal S, and receives a signals from comparator C2 at a reset terminal R. When RS flip-flop 120 receives from comparator C1 a signal having a logical value varying from "0" to "1," that is, when the U-phase current deviation Mu exceeds the upper limit Δiu, RS flip-flop 120 changes a logical value of a signal output from output terminal Q from "0" to "1." When RS flip-flop 120 receives from comparator C2 a signal having a logical value varying from "0" to "1," that is, when the U-phase current deviation Mu falls below the lower limit ΔiuL, RS flip-flop 120 changes a logical value of a signal output from output terminal Q from "1" to "0." RS flip-flop 120 outputs a signal, which corresponds to the PWM signal Uo (see FIG. 1).

The PWM signal Uo output from hysteresis comparator 10*u* is input to gate signal generation circuit 11. Gate signal generation circuit 11 subjects the PWM signal Uo and its logically inverted signal to prescribed on-delay processing to generate gate signals G1 and G2 for controlling the switching of switching elements Q1 and Q2, respectively, configuring the U-phase arm of inverter 2.

Figure 3:
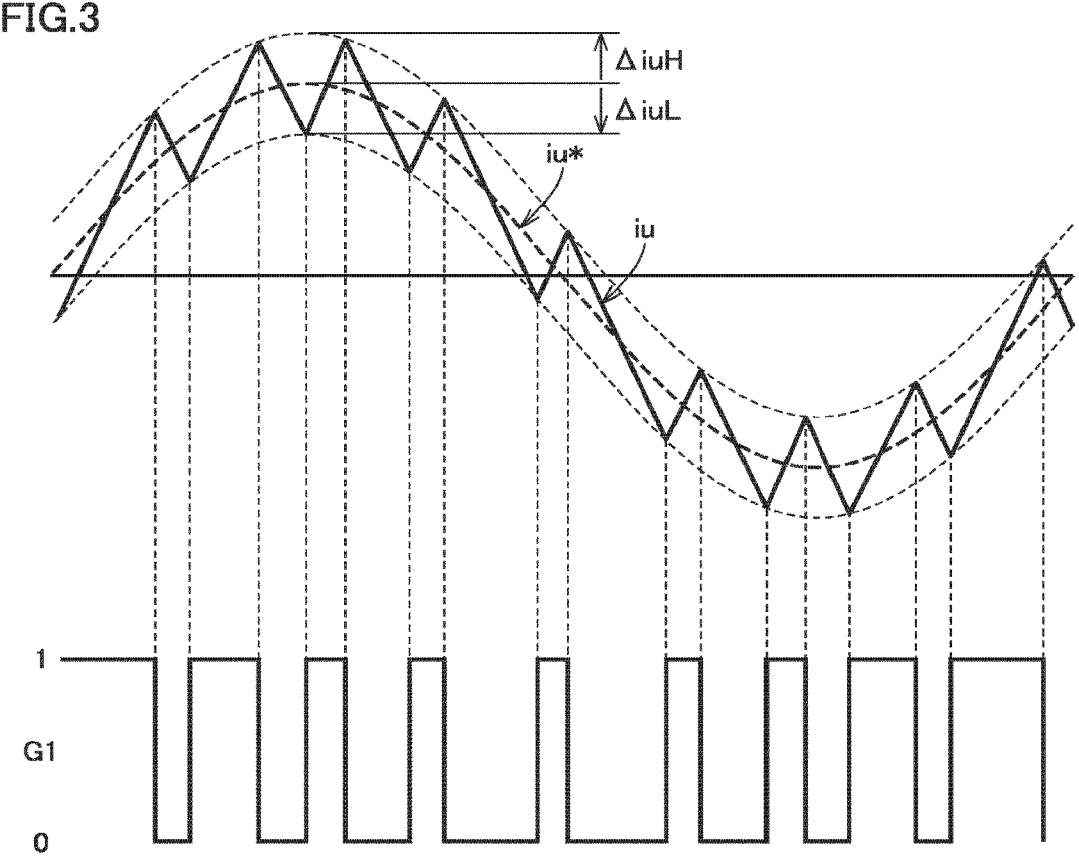
FIG. 3 is a diagram for illustrating an operation of a power conversion device according to the conventional, exemplary configuration shown in FIG. 2.

FIG. 3 is a diagram for illustrating an operation of power conversion device 100 according to the conventional, exemplary configuration shown in FIG. 2. In FIG. 3 will be described an operation of power conversion device 100 according to an example of a conventional configuration with the U-phase as an example. The V phase and the W phase are similarly discussed.

In FIG. 3 at an upper stage, a broken line represents the U-phase current command value iu* in the form of a sine wave. A dotted line represents a hysteresis band provided for the U-phase current command value iu*. The upper limit value ΔiuH and the lower limit value ΔiuL each have a magnitude of one half of the hysteresis band. A solid line represents the U-phase current iu of inverter 2. FIG. 3 at a lower stage represents the gate signal G1 for switching switching element Q1. The gate signal G2 (not shown) is an inverted version of the gate signal G1.

When the U-phase current iu varies in the positive direction and the U-phase current deviation Δiu reaches the upper limit value ΔiuH, the gate signal G1 is set to a logical value of "0" and the gate signal G2 is set to a logical value of "1." Gate signal G1 having the logical value of "0" turns off switching element Q1 of inverter 2. Gate signal G2 having the logical value of "1" turns on switching element Q2 of inverter 2. As a result, a negative voltage is applied to an AC load, and accordingly, output current iu varies in the negative direction.

When the U-phase current iu varies in the negative direction and the U-phase current deviation Δiu reaches the lower limit value ΔiuL, the gate signal G1 is set to the logical value of "1" and the gate signal G2 is set to the logical value of "0." Gate signal G1 having the logical value of "1" turns on switching element Q1 of inverter 2. Gate signal G2 having the logical value of "0" turns off switching element Q2 of inverter 2. As a result, a positive voltage is applied to the AC load, and accordingly, current iu varies in the positive direction.

In this manner, switching elements Q1 and Q2 are switched as controlled to cause the U-phase current iu to be within the hysteresis band composed of the upper limit value $\Delta iuH$ and the lower limit value $\Delta iuL$ with respect to the U-phase current command value iu*.

In the example configuration of FIG. 2, the hysteresis band can be adjusted by the magnitude of the gain K by which the current threshold value 130 is multiplied. Specifically, the hysteresis band increases as the value of the gain K increases. When the hysteresis band increases, a switching element is less often switched, and a switching frequency decreases. As a result, a switching loss caused in inverter 2 decreases. On the other hand, a current ripple superimposed on reactor current iu increases, and accordingly, a loss caused in reactor 3 (hereinafter also referred to as a "reactor loss") will increase.

In contrast, when the value of the gain K is decreased, the hysteresis band becomes smaller, and the switching frequency in inverter 2 increases. As a result, a switching loss caused in inverter 2 increases. On the other hand, the current ripple becomes small, and accordingly, the reactor loss will be decreased. The gain K corresponds to a "second gain."

It is known that when inverter 2 is in operation, a current ripple becomes larger around a time when the reactor current is inverted in direction (or polarity) (i.e., around a current zero crossing) than around a time when the reactor current peaks (i.e., around a current peak). This is because when a power factor of reactor currents iu, iv, iw with respect to three-phase AC voltages Vu, Vv, Vw is 1, reactor 3 has an inter-terminal voltage peaking around the current zero crossing. Therefore, around the current zero crossing, the reactor loss increases, and the reactor current has an increasing noise component. To reduce a current ripple, it is effective to increase the inductance of reactor 3. However, increasing the inductance would invite increasing reactor 3 in size and weight.

As has been set forth above, while reducing a hysteresis band can reduce a current ripple, doing so increases a switching frequency in inverter 2, and will hence increase a switching loss. Around a current peak, in particular, there is a concern that the switching loss will increase significantly.

Accordingly, in the present embodiment, the hysteresis band is made smaller in a prescribed area including a current zero crossing for which a current ripple increases (hereinafter also referred to as a "current zero crossing area") than in a prescribed area including a current peak (hereinafter also referred to as a "current peak area"). According to this, while the current ripple can be reduced in the current zero crossing area, the switching frequency increases. However, the reactor current per se is small in the current zero crossing area, and an increase in a switching loss caused as the switching frequency increases can be suppressed. In contrast, in the current peak area, the switching frequency can be lowered by increasing the hysteresis band, and as a result, an increase in a switching loss can be suppressed.

Hereinafter, how power conversion device 100 according to the present embodiment is configured and operates will be described. Power conversion device 100 according to the present embodiment is different from the conventional configuration shown in FIG. 2 as an example in how current threshold value generation circuit 13 in controller 20 is configured, and accordingly only the different point will be described.

Figure 4:
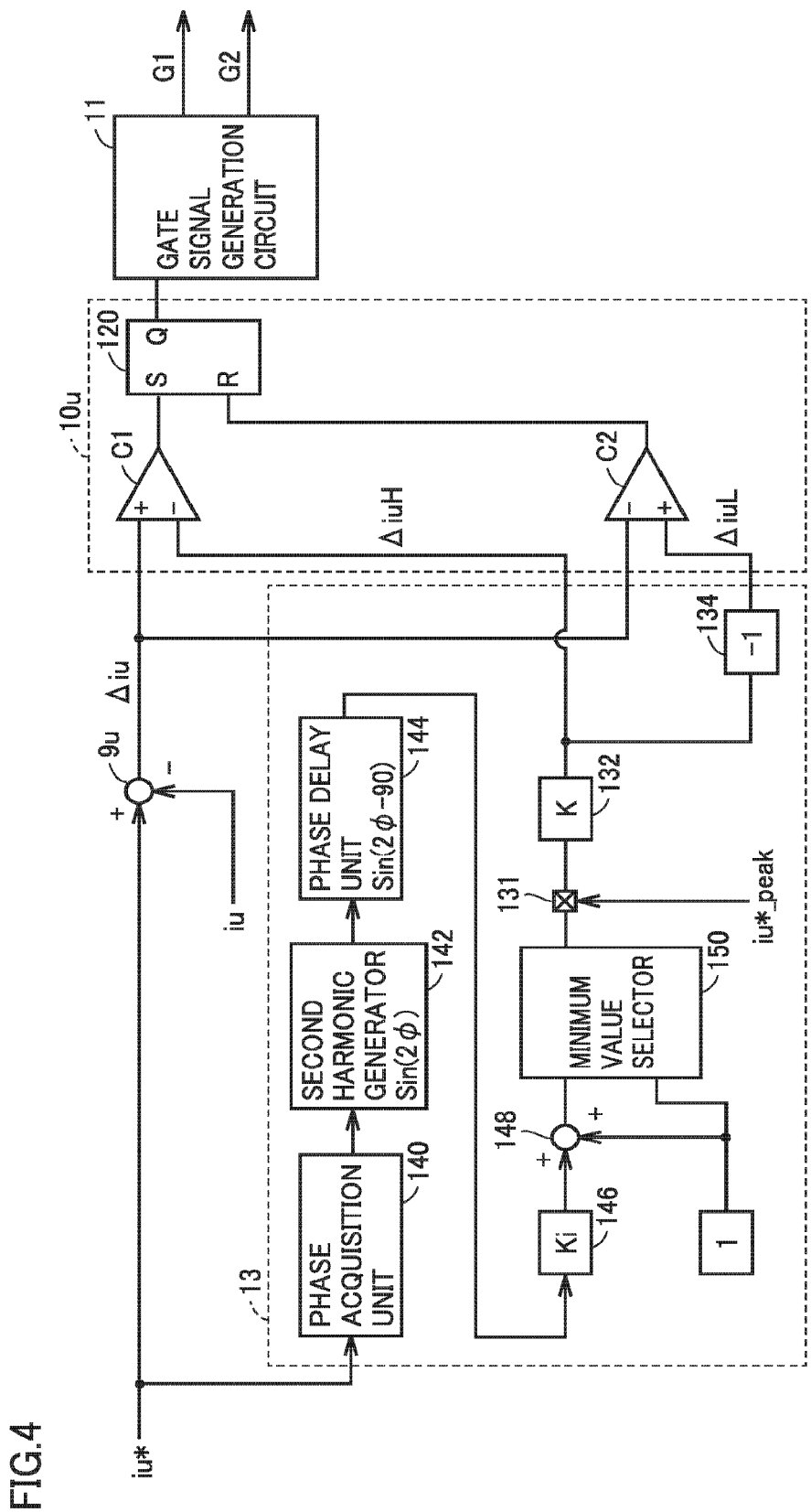
FIG. 4 is a block diagram showing an example configuration of a current threshold value generation circuit and a hysteresis comparator in the power conversion device according to the present embodiment.

FIG. 4 is a block diagram showing an example configuration of current threshold value generation circuit 13 and hysteresis comparator 10u in power conversion device 100 according to the present embodiment. FIG. 4 representatively shows a portion of current threshold value generation circuit 13 that relates to generation of a threshold value for the U-phase current deviation $\Delta iu$ (i.e., the upper limit value $\Delta iuH$ and the lower limit value $\Delta iuL$). A threshold value for the V-phase current deviation $\Delta iv$ and that for the W-phase current deviation $\Delta iw$ can also be generated using the same configuration.

Referring to FIG. 4, current threshold value generation circuit 13 according to the present embodiment, as well as the conventional current threshold value generation circuit 13 shown in FIG. 2, is configured to generate a threshold value (the upper limit value $\Delta iH$ and the lower limit value $\Delta iL$) for the current deviation $\Delta i$ (the U-phase current deviation $\Delta iu$, the V-phase current deviation $\Delta iv$ and the W-phase current deviation $\Delta iw$). It should be noted, however, that current threshold value generation circuit 13 according to the present embodiment is different from the conventional current threshold value generation circuit 13 in that the former includes a phase acquisition unit 140, a second harmonic generator 142, a phase delay unit 144, a multiplier 146, an adder 148, and a minimum value selector 150 instead of current threshold value 130.

Phase acquisition unit 140 obtains a phase $\varphi$ of the U-phase current command value iu*. Second-harmonic generator 142 doubles the obtained phase $\varphi$, and, with the phase $2\varphi$ as an input, generates a sine wave having an amplitude of "1." A second harmonic component $\sin(2\varphi)$ of the U-phase current command value iu* is thus generated.

Phase delay unit 144 delays the phase of the generated second harmonic component $\sin(2\varphi)$ by 90° with respect to the phase $\varphi$ of the U-phase current command value iu* to generate a delayed second harmonic component. Phase delay unit 144 outputs the delayed second harmonic component $\sin(2\varphi-90°)$, which multiplier 146 multiplies by a gain Ki. The gain Ki is a coefficient for determining an amplitude for the delayed second harmonic component $\sin(2\varphi-90°)$. The gain Ki can take any value within a range of 0 to 1. The gain Ki corresponds to a "first gain."

Adder 148 adds "1" to the delayed second harmonic component $Ki \times \sin(2\varphi-90°)$ generated by multiplier 146. As a result, the delayed second harmonic component is offset by "+1" in the positive direction to be $Ki \times \sin(2\varphi-90°)+1$.

Minimum value selector 150 selects the smaller one in value of the delayed second harmonic component $Ki \times \sin(2\varphi-90°)+1$ generated by adder 148 and the value of "1." Multiplier 131 multiplies the value selected by minimum value selector 150 by the peak value (iu*_peak) of the U-phase current command value iu*.

The value calculated by multiplier 131 constitutes the "current threshold value" indicated in FIG. 2. It should be noted, however, that in the conventional exemplary configuration shown in FIG. 2, the current threshold value is a preset fixed value, whereas in the present embodiment, the current threshold value is a variable value periodically varying in response to doubling of the phase $\varphi$ of the U-phase current command value iu*.

multiplier 132 multiplies a signal output from multiplier 131 by a gain K (a second gain). As shown in FIG. 2, the gain K is a coefficient for determining a hysteresis band and can take any positive value. Multiplier 132 provides a result of the multiplication to hysteresis comparator 10u as the upper limit value $\Delta iuH$ for the U-phase current deviation $\Delta iu$.

Multiplier 134 multiplies the result of the multiplication by multiplier 132 by "−1." Multiplier 134 provides a result of the multiplication to hysteresis comparator 10u as the lower limit value ΔiuL for the U-phase current deviation Δiu. The upper limit value ΔiuH and the lower limit value ΔiuL are equal in magnitude and have different signs.

Figure 5:
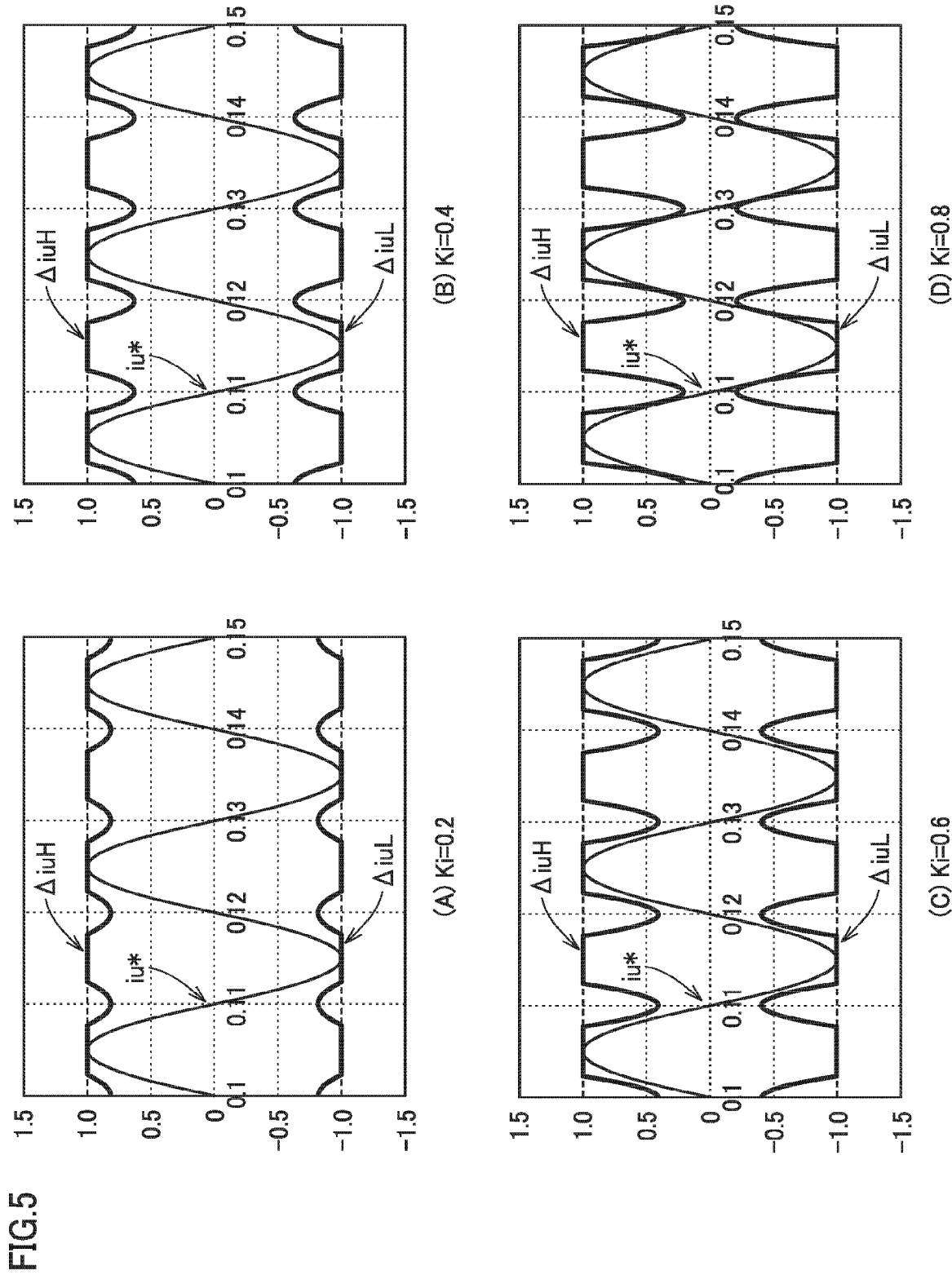
FIG. 5 is a diagram for illustrating an operation of the current threshold value generation circuit shown in FIG. 4.

FIG. 5 is a diagram for illustrating an operation of current threshold value generation circuit 13 shown in FIG. 4. FIGS. 5(A) to 5(D) show in waveform the upper limit value ΔiuH and the lower limit value ΔiuL generated by current threshold value generation circuit 13 of FIG. 4. In the examples of FIGS. 5(A) to 5(D), the gain K of multiplier 132 is set to K=1.0.

FIG. 5(A) shows in waveform the upper limit value ΔiuH and the lower limit value ΔiuL when the gain Ki=0.2. FIG. 5(A) also shows in waveform the U-phase current command iu* having an amplitude normalized to "1."

As the upper limit value ΔiuH and the lower limit value ΔiuL are generated by using the minimum value of the delayed second harmonic component, i.e., 0.2×Sin(2φ−90°)+1 and the value of "1," the upper limit value ΔiuH and the lower limit value ΔiuL vary at twice of the frequency of the U-phase current command iu*. The difference between the upper limit value ΔiuH and the lower limit value ΔiuL corresponds to a hysteresis band.

As shown in FIG. 5(A), the upper limit value ΔiuH and the lower limit value ΔiuL have a magnitude of "1" around a peak of the U-phase current command iu*, whereas the upper limit value ΔiuH and the lower limit value ΔiuL have a magnitude of less than "1" around a zero crossing of the U-phase current command iu*. This results in a smaller hysteresis band around the zero crossing of the U-phase current command iu* than around the current peak thereof.

FIG. 5(B) shows in waveform the upper limit value ΔiuH and the lower limit value ΔiuL when the gain Ki=0.4. FIG. 5(C) shows in waveform the upper limit value ΔiuH and the lower limit value ΔiuL when the gain Ki=0.6. FIG. 5(D) shows in waveform the upper limit value ΔiuH and the lower limit value ΔiuL when the gain Ki=0.8.

When FIGS. 5(A) to 5(D) are compared, it can be seen that as the gain Ki (the first gain) increases, the upper limit value ΔiuH and the lower limit value ΔiuL around a current zero crossing decrease in magnitude. That is, as the gain Ki increases, a hysteresis band near the current zero crossing decreases. In contrast, the upper limit value ΔiuH and the lower limit value ΔiuL around a current peak indicate a constant value of "1" regardless of the magnitude of the gain Ki. That is, increasing the gain Ki does not change a hysteresis band around the current peak.

According to this, depending on the gain Ki, a hysteresis band in a current peak area is not changed, and a hysteresis band in a current zero crossing area can alone be changed. Thus, in the present embodiment, by adjusting in magnitude the gain Ki applied to multiply a delayed second harmonic component of the U-phase current command value iu* in current threshold value generation circuit 13 (see FIG. 4), the hysteresis band in the current zero crossing area can be set to have any magnitude.

An operation of power conversion device 100 according to the present embodiment will now be described. FIGS. 6 to 10 are diagrams for illustrating an operation of inverter 2 when the gain Ki is changed. FIGS. 6 to 10 each represent, from the top, the three-phase AC voltages Vu, Vv, Vw, the current command values iu*, iv*, iw*, the U-phase current iu, and the U-phase current deviation Δiu in waveform. The U-phase current deviation Δiu indicated at the bottom is obtained by subtracting the U-phase current iu from the U-phase current command value iu*. The waveforms of the upper limit value ΔiuH and the lower limit value ΔiuL generated by current threshold value generation circuit 13 shown in FIG. 4 are superimposed on the waveform of the U-phase current deviation Δiu. In FIGS. 6 to 10, the gain K is set to be equal to 0.25.

Figure 6:
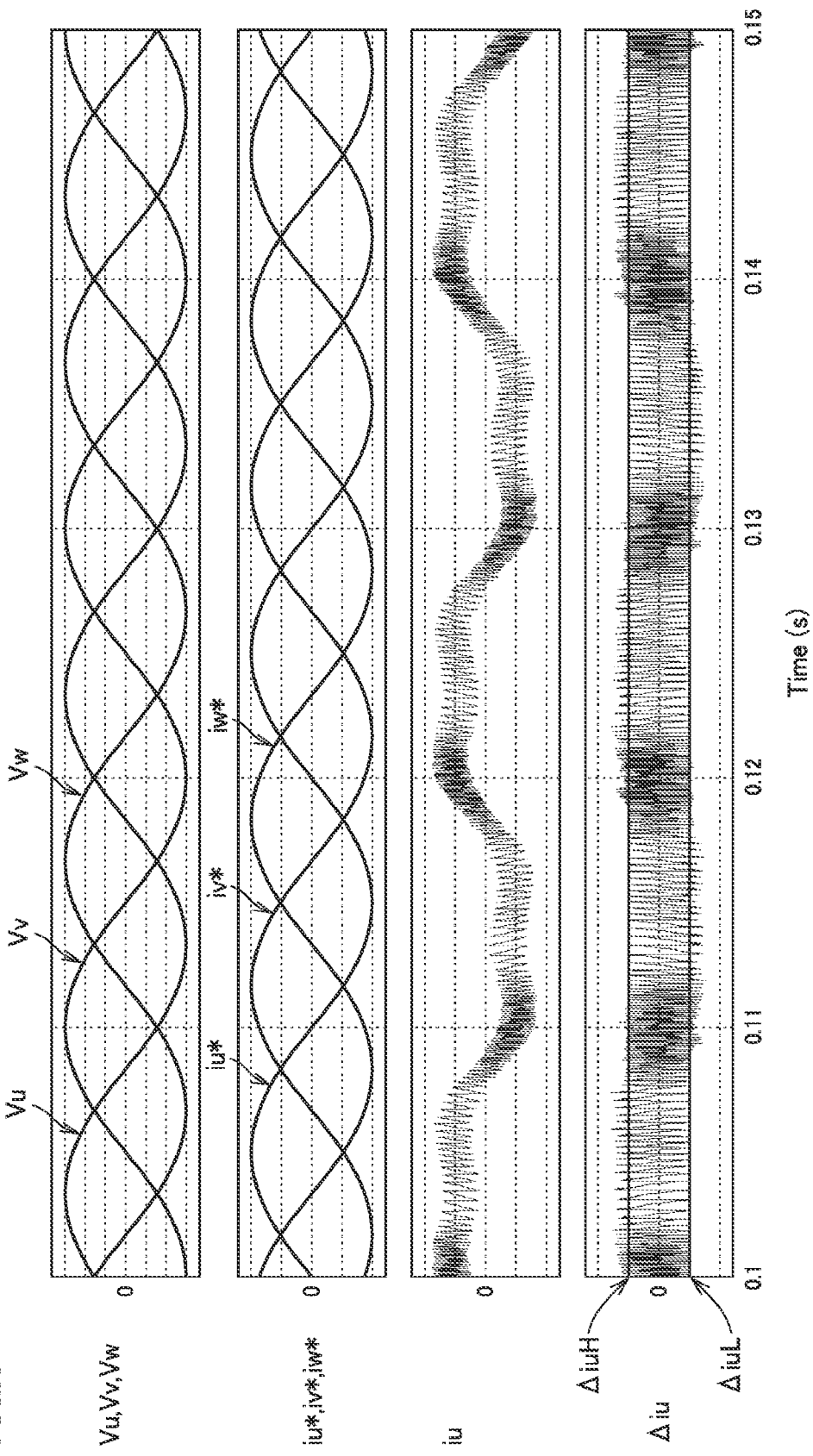
FIG. 6 is a diagram for illustrating an operation of the power conversion device according to the present embodiment.

FIG. 6 is a diagram for illustrating an operation inverter 2 when the gain Ki=0, that is, in the conventional, exemplary configuration shown in FIG. 2. As shown in FIG. 6, when the gain Ki=0, the upper limit value ΔiuH and the lower limit value ΔiuL have fixed values regardless of the magnitude of the U-phase current command value iu*, and accordingly, the hysteresis band is also fixed. Around a current zero crossing, an increased current deviation is provided, and accordingly, a signal output from hysteresis comparator 10 is invertible. As a result, switching is more frequently done around the current zero crossing than around a current peak.

Figure 7:
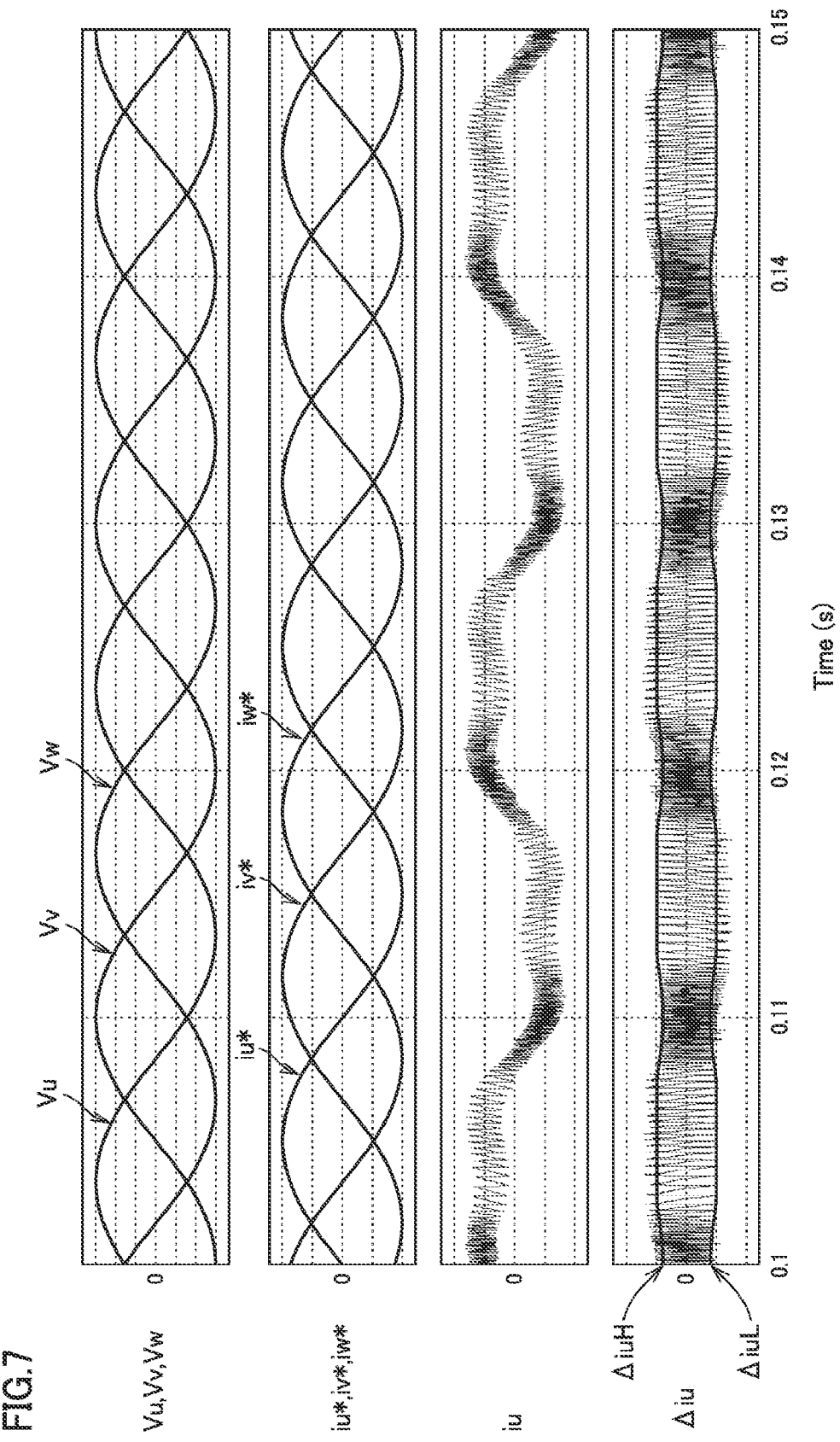
FIG. 7 is a diagram for illustrating an operation of the power conversion device according to the present embodiment.

FIG. 7 is a diagram for illustrating an operation of inverter 2 when the gain Ki=0.2, that is, when the hysteresis band shown in FIG. 5(A) is used. Referring to FIG. 7, when the gain Ki=0.2, the upper limit value ΔiuH and the lower limit value ΔiuL around a current zero crossing are smaller in magnitude than those in FIG. 6. That is, a hysteresis band around the current zero crossing is smaller than that in FIG. 6. According to this, around the current zero crossing, as a hysteresis band decreases, a switching frequency increases, and a current ripple can be reduced.

Figure 8:
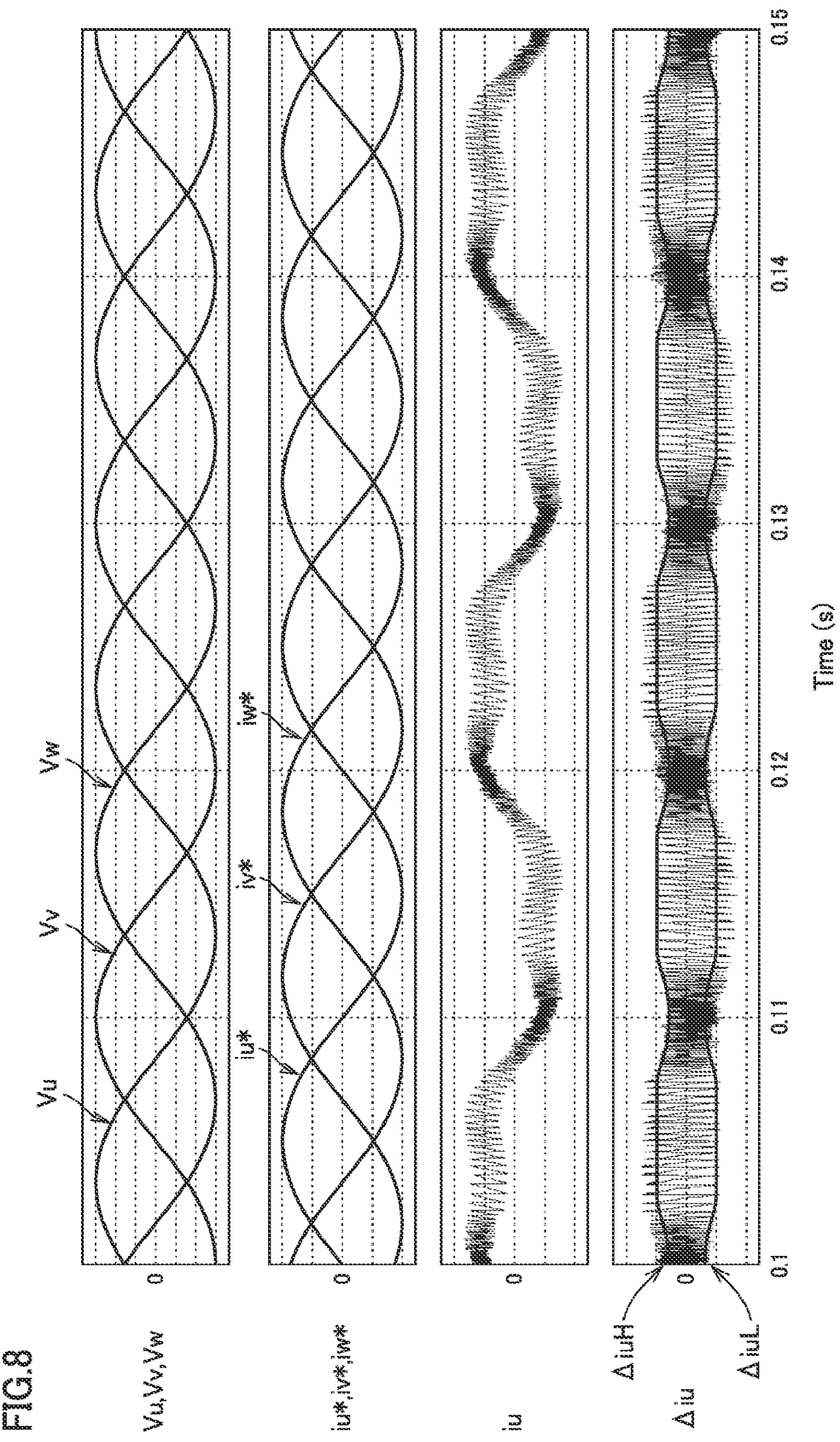
FIG. 8 is a diagram for illustrating an operation of the power conversion device according to the present embodiment.
Figure 9:
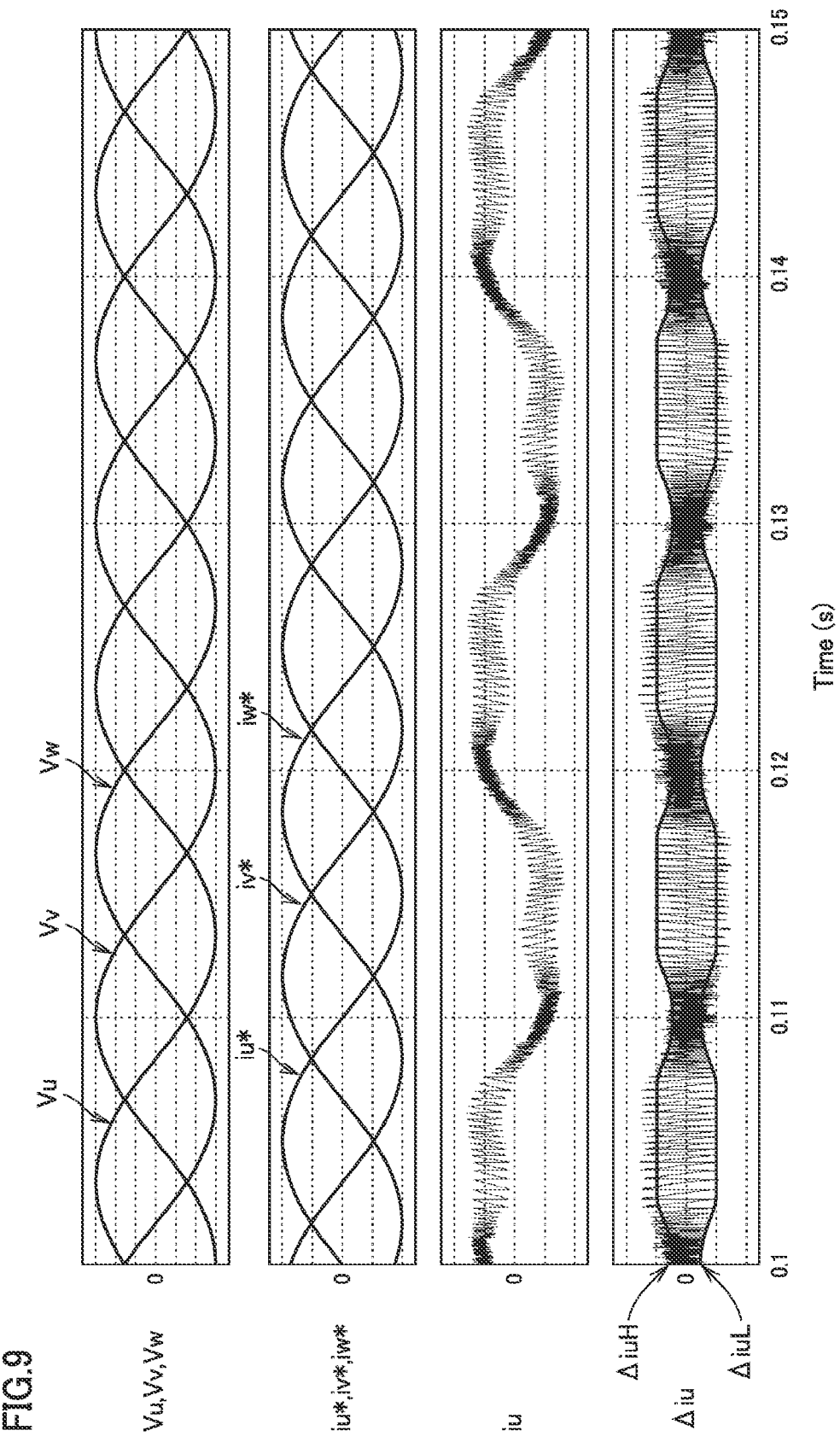
FIG. 9 is a diagram for illustrating an operation of the power conversion device according to the present embodiment.
Figure 10:
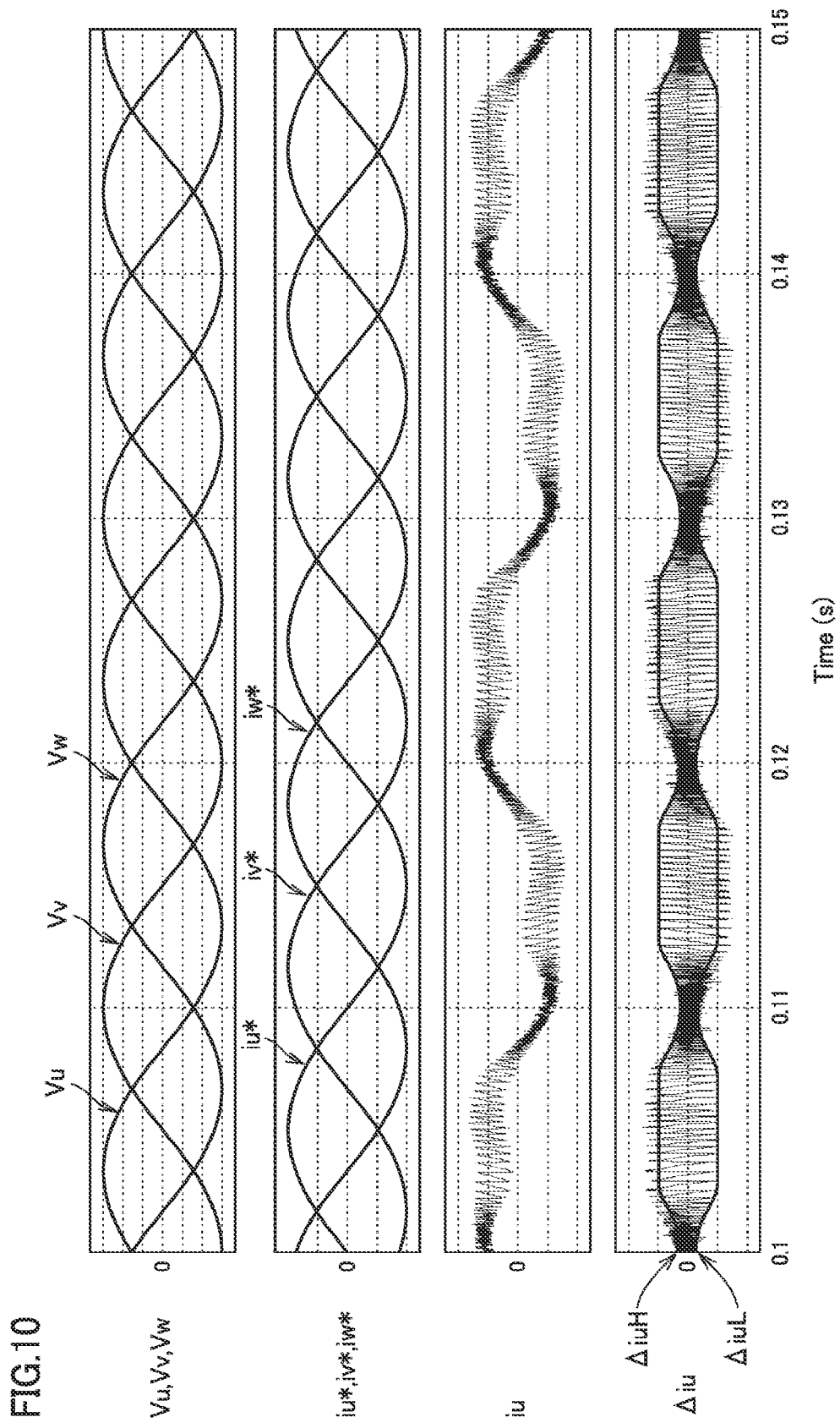
FIG. 10 is a diagram for illustrating an operation of the power conversion device according to the present embodiment.

FIG. 8 is a diagram for illustrating an operation of inverter 2 when the gain Ki=0.4, that is, when the hysteresis band shown in FIG. 5(B) is used. FIG. 9 is a diagram for illustrating an operation of inverter 2 when the gain Ki=0.6, that is, when the hysteresis band shown in FIG. 5(C) is used. FIG. 10 is a diagram for illustrating an operation of inverter 2 when the gain Ki=0.8, that is, when the hysteresis band shown in FIG. 5(D) is used.

When the current deviations Δiu among FIGS. 6 to 10 are compared, as the gain Ki is larger, the upper limit value ΔiuH and the lower limit value ΔiuL around a current zero crossing are smaller in magnitude and accordingly, a smaller hysteresis band is provided. Accordingly, the U-phase current deviation Δiu around the current zero crossing is smaller. That is, as the gain Ki is larger, a smaller current ripple is provided. On the other hand, as the gain Ki is larger, switching around the current zero crossing is more frequently performed.

Thus in current threshold value generation circuit 13 according to the present embodiment, the gain Ki (the first gain) can be used to adjust a ratio of a hysteresis band around a current zero crossing and a hysteresis band around a current peak. Further, the gain K (the second gain) can be used to adjust the hysteresis band around the current peak. Therefore, the gain Ki and the gain K can each be changed in magnitude depending on peak values of the current command values iu*, iv*, iw*.

Figure 11:
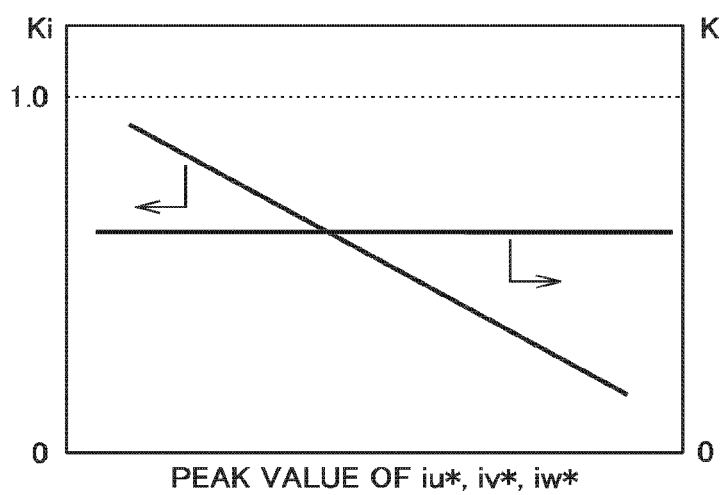
FIG. 11 represents a first example of a correspondence between gains Ki and K and a current command value.

FIG. 11 shows a first example of a correspondence between the gains Ki and K and a current command value. In FIG. 11, the horizontal axis represents a peak value of the current command value, and the vertical axis represents the gains Ki and K. In the first example shown in FIG. 11, the gain Ki is configured to increase as the peak value of the current command value decreases. Note that a characteristic line representing a correspondence between the gain Ki and the current command value is not limited to a straight line, and may be stepwise, curved, or the like. In the first example, as inverter 2 outputs a current with a smaller peak value, a smaller switching loss is provided, and the example is resistant to an effect of an increase of a switching frequency caused as a hysteresis band around a current zero crossing decreases. Thus a current ripple can be reduced without increasing a switching loss.

Figure 12:
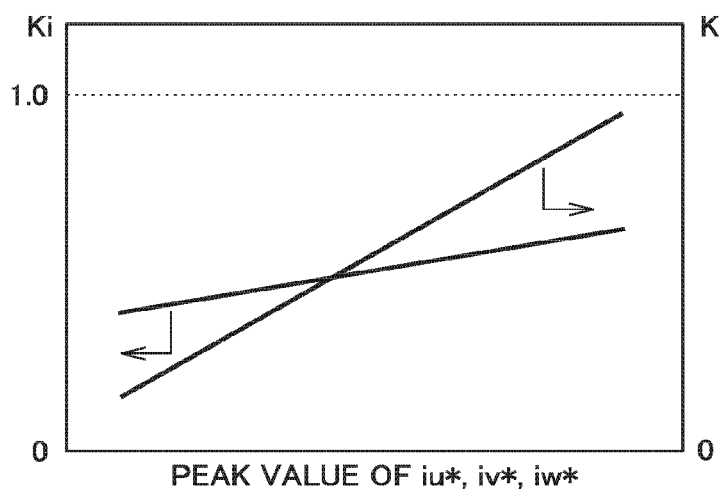
FIG. 12 represents a second example of a correspondence between gains Ki and K and a current command value.

FIG. 12 shows a second example of a correspondence between the gains Ki and K and the current command value. In FIG. 12, the horizontal axis represents a peak value of the current command value and the vertical axis represents the gains Ki and K. In the second example shown in FIG. 12, the gain K is configured to increase as the peak value of the current command value increases.

In the second example, as inverter 2 outputs a larger current, a hysteresis band around the current peak is larger, and a reduced switching loss is provided. In contrast, a current ripple around a current zero crossing would be increased. Accordingly, as the gain K is increased, the gain Ki is accordingly increased to reduce a hysteresis band around the current zero crossing. This can reduce switching loss and also reduce current ripple. A characteristic line representing the correspondence between each of the gains K and Ki and the current command value is not limited to a straight line, and may be stepwise, curved, or the like.

The presently disclosed embodiment is illustrative in any respect and should not be considered as restrictive. The scope of the present invention is defined by the terms of the claims, rather than the description above, and is intended to include any modifications within the meaning and scope equivalent to the terms of the claims.

REFERENCE SIGNS LIST

1 DC smoothing capacitor, 2 inverter, 3 reactor, 5 current detector, 6 voltage detector, 8u, 8v, 8w, 131, 132, 134, 146 multiplier, 9u, 9v, 9w subtractor, 10u, 10v, 10w hysteresis comparator, 11 gate signal generation circuit, 12 gate circuit, 13 current threshold value generation circuit, 120 RS flip-flop, 140 phase acquisition unit, 142 second harmonic generator, 144 phase delay unit, 148 adder, 150 minimum value selector, C1, C2 comparator, Q1-Q6 switching element, D1-D6 diode, PL DC positive bus, NL DC negative bus.

The invention claimed is:

1. A power conversion device comprising:
an inverter that has a switching element and converts DC power into AC power;
a current detector that detects an output current of the inverter; and
a controller that controls the inverter to allow the output current detected by the current detector to follow a current command value having a sinusoidal waveform, wherein
the controller compares a current deviation of the output current from the current command value with a hysteresis band to control switching of the switching element, and
the controller sets the hysteresis band so that the hysteresis band in a zero-crossing area of the current command value is smaller than the hysteresis band in a peak area of the current command value.

2. The power conversion device according to claim 1, wherein the controller
generates a sine wave having a frequency twice that of the current command value,
multiplies a delayed sine wave with a phase delayed by 90 degrees from the sine wave by a first gain, and
sets an upper limit value and a lower limit value for the hysteresis band based on a minimum value of a value of the delayed sine wave multiplied by the first gain and a first value added together and the first value.

3. The power conversion device according to claim 2, wherein the controller includes:
a phase delay unit that delays a phase of a second harmonic component of the current command value by 90 degrees to generate a delayed second harmonic component;
an adder that adds the first value to a value of the delayed second harmonic component multiplied by the first gain; and
a selector that selects a minimum value of a result of the addition by the adder and the first value.

4. The power conversion device according to claim 2, wherein the first gain is variable within a range of 0 to 1.

5. The power conversion device according to claim 3, wherein the first gain is variable within a range of 0 to 1.

6. The power conversion device according to claim 5, wherein the controller modifies the first gain in accordance with a peak value of the current command value.

7. The power conversion device according to claim 5, wherein
the controller multiplies the minimum value by a second gain having a positive value to set the upper limit value, and inverts the upper limit value in polarity to set the lower limit value, and
the controller changes at least one of the first gain and the second gain in accordance with a peak value of the current command value.

8. The power conversion device according to claim 4, wherein the controller modifies the first gain in accordance with a peak value of the current command value.

9. The power conversion device according to claim 4, wherein
the controller multiplies the minimum value by a second gain having a positive value to set the upper limit value, and inverts the upper limit value in polarity to set the lower limit value, and
the controller changes at least one of the first gain and the second gain in accordance with a peak value of the current command value.

* * * * *